United States Patent
Tateyama (10) Patent No.: US 7,814,869 B2
(45) Date of Patent: Oct. 19, 2010

(54) HOT WATER SUPPLY SYSTEM

(75) Inventor: Iwao Tateyama, Nagoya (JP)

(73) Assignee: Paloma Industries, Limited, Nagoya-Shi (JP)

(*) Notice: Subject to any disclaimer, the term of this patent is extended or adjusted under 35 U.S.C. 154(b) by 535 days.

(21) Appl. No.: 11/776,703

(22) Filed: Jul. 12, 2007

(65) Prior Publication Data
US 2008/0023565 A1 Jan. 31, 2008

(30) Foreign Application Priority Data
Jul. 27, 2006 (JP) .............................. 2006-204430

(51) Int. Cl.
*F24D 3/08* (2006.01)
(52) U.S. Cl. .................. 122/20 R; 237/8 R; 237/19
(58) Field of Classification Search .............. 122/13.01, 122/14.1, 20 R; 237/8 R, 19, 8 A, 8 D; 700/3, 700/9
See application file for complete search history.

(56) References Cited

U.S. PATENT DOCUMENTS

| 4,483,310 A | * | 11/1984 | Kelly | ........................... | 126/35 |
| 4,534,321 A | * | 8/1985 | Rydborn | ................... | 122/448.3 |
| 5,125,572 A | * | 6/1992 | Piegari | ........................ | 237/8 R |
| 7,058,457 B2 | * | 6/2006 | Kuwahara et al. | ............... | 700/9 |
| 7,477,950 B2 | * | 1/2009 | DeBourke et al. | ............. | 700/19 |
| 7,529,593 B2 | * | 5/2009 | Kitagawa et al. | ............... | 700/3 |

FOREIGN PATENT DOCUMENTS

JP 2004-116973 A1 4/2004

* cited by examiner

*Primary Examiner*—Gregory A Wilson
(74) *Attorney, Agent, or Firm*—Burr & Brown (57) ABSTRACT

The present invention provides a hot water supply system using at least two water heaters having versatility to realize switching between a single hot water supply operation mode and a connected hot water supply operation mode of the water heaters and connected operation control after switching to the connected hot water supply operation mode with a simple configuration. Two water heaters D1, D2 each includes a dip switch operated when setting the connected hot water supply operation mode of the two water heaters. When each dip switch is in the ON state to set the connected hot water supply operation mode, hot water supply control by the connected operation is performed under the mutual communication via a communication cable L in the two water heaters D1, D2.

4 Claims, 7 Drawing Sheets

HOT WATER SUPPLY SYSTEM

BACKGROUND OF THE INVENTION

This application claims the benefit of Japanese Patent Application Number 2006-204430 filed on Jul. 27, 2006, the entirety of which is incorporated by reference.

FIELD OF THE INVENTION

The present invention relates to a hot water supply system including at least two water heaters using fuel gas as fuel.

DESCRIPTION OF THE RELATED ART

Conventionally, for this type of hot water supply system, a hot water supply system disclosed in Japanese Laid-Open Patent Publication No. 2004-116973 is proposed, for example. In such a hot water supply system, each water heater includes a controller for executing cooperative operation (connected operation). Between the controllers, an external cable is arranged across two water heaters to connect the water heaters and to cooperatively operate the same.

In the hot water supply system described above, the external cable is connected between each controller and arranged across two water heaters as described above.

The external cable has a special wiring circuit configuration to cooperatively operate each water heater, and each water heater is also a dedicated water heater complying with the special wiring circuit configuration of the external cable. Thus, two dedicated water heaters described above and a dedicated external cable are essential in such a hot water supply system.

Therefore, for example, the quantity of hot water lacks when using one water heater having versatility and addition of one water heater cannot be realized with the water heater having versatility, whereby the dedicated water heater described above that is not easily available in the market and an external circuit having a special wiring circuit configuration must be obtained. The water heater that is already being used inevitably becomes a waste, the water heater does not have degree of freedom of selection and thus is very inconvenient.

In view of increasing the quantity of hot water supply in the future, the dedicated water heater described above that is not easily available in the market and an external circuit having a special wiring circuit configuration must be obtained from the beginning as presupposition. In this case, the water heater does not have degree of freedom of selection and thus is very inconvenient.

In order to respond to the above, the present invention aims to provide a hot water supply system that uses at least two water heaters having versatility without depending on the dedicated water heater, capable of switching between the single hot water supply operation mode and connected hot water supply operation mode, and performing connected operation control after switched to the connected hot water supply operation mode of the water heaters with a simple configuration.

SUMMARY OF THE INVENTION

In solving the above problems, according to a first aspect, the hot water supply system according to the present invention includes at least two water heaters each including a hot water supplying means for heating water supplied to water passing system in response to combustion of fuel gas and supplying hot water, a setting operation means for performing various setting operations related to the hot water supply by the hot water supplying means, and an operation controlling means for operation controlling the hot water supplying means based on the setting operation of the setting operation means, each operation controlling means being connected to each other via a communication means and performing the operation control under mutual communication via the communication means.

In such a hot water supply system, the communication means is a communication line for connecting each operation controlling means to each other; every operation controlling means of the at least two water heaters includes a single operation controlling means for operation controlling to have the corresponding water heater in a single hot water supply operation mode and a connected operation controlling means for connected operation controlling under mutual communication via a communication line so as to have the corresponding water heater in a connected hot water supply operation mode with the other water heater; and every setting operation means of the at least two water heaters also serves as a switching means for switching between the single hot water supply operation mode of the corresponding water heater and the connected hot water supply operation mode with the other water heater.

Therefore, each setting operation means of the at least two water heaters is switch-operated to the single hot water supply operation mode of the corresponding water heater or the connected hot water supply operation mode between the other water heaters according to the function serving as the switching means.

Therefore, each water heater is able to be easily set to the single hot water supply operation mode or the connected hot water supply operation mode with a simple configuration of the setting operation means as described above, without depending on a dedicated circuit configuration as described in the problems to be solved of the invention of the present specification.

Each setting operation means for performing various setting operations related to hot water supply by the hot water supplying means is also used as a switching means for switching between the single hot water supply operation mode of the corresponding water heater and the connected hot water supply operation mode between the other water heaters. Therefore, the setting of the connected hot water supply operation mode becomes more convenient by adopting such a setting operation means.

When each setting operation means arranged in at least two water heaters is switch-operated to set the corresponding water heater to the connected hot water supply operation mode, each hot water supplying means of at least two water heaters is connected-hot-water-supply-operation controlled under the mutual communication via a communication line by the connected operation controlling means.

This means that at least two water heaters are respectively provided as water heaters having versatility under a simple circuit configuration of the setting operation means and a communication line as described above without depending on the dedicated water heater and the circuit configuration as described in the problems to be solved of the invention of the present specification.

Therefore, even if only one of at least two water heaters is used, for example, in the initial construction, and another water heater is added to at least two water heaters thereby building the hot water supply system, at least two water heaters does not require replacement of water heater and electrical control circuit thereof since the water heaters already have the versatility of the above configuration.

Consequently, the hot water supply system can be very easily and economically built by using the water heater having the versatility of the above configuration.

According to a second aspect, the present invention further includes a remote controller for remote operation in the hot water supply system according to the first aspect, wherein every connected operation controlling means of the at least two water heaters provides the connected operation controlling means including a connection determining means for determining the presence or absence of the connection with the remote controller, and a specifying means for specifying the water heater having the connected operation controlling means as a main water heater when it is determined to be connected by the remote controller by the connection determining means, and then specifying the water heater having the connected operation controlling means as a sub-water heater when it is not determined to be not connected with the remote controller by the connection determining means; and the connected operation controlling means of the water heater is specified as the main water heater of at least two water heaters that mainly performs the connected operation control on the connected operation controlling means of the other water heater under mutual communication via a communication line, and the connected operation controlling means of the water heater specified as the sub-water heater dependently performs the connected operation control on the connected operation controlling means of the other water heater under mutual communication via a communication line.

According to such a configuration, the water heater responsible for the main action and the water heater dependent thereon are reliably specified in the connected hot water supply operation mode based on the connection with the remote controller with the setting operation of the connected hot water supply operation mode described above.

Therefore, under such a specification, the hot water supply in the connected hot water supply operation mode is appropriately realized with the water heater serving as the main water heater and the water heater serving as the sub-water heater under the mutual communication via a communication line. As a result, the effect of the invention described is more specifically achieved.

According to a third aspect, the present invention further has a setting operation means of at least two water heaters as a dip switch in the hot water supply system described in both the first and second aspects.

Accordingly, regarding each dip switch serving as a setting operation means, the dip switch having versatility that performs various setting operations related to the hot water supply by the hot water supplying means can also be used in switching between the single hot water supply operation mode and the connected hot water supply operation mode, and thus the effect of the invention described in the first and second aspect is further enhanced.

DETAILED DESCRIPTION OF THE INVENTION

Figure 1:
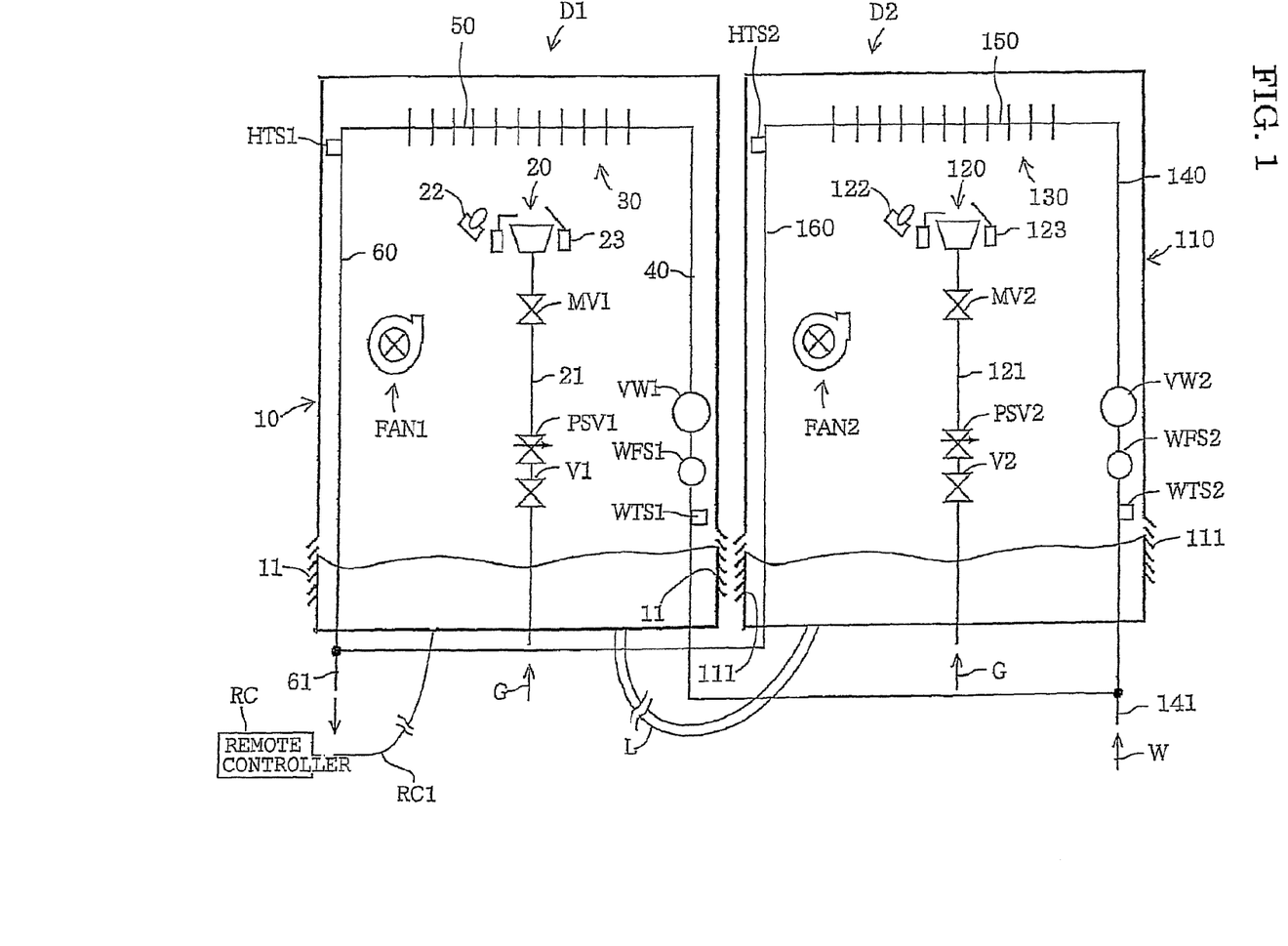
FIG. 1 is a partially broken front view showing one embodiment of a hot water supply system according to the present invention.

One embodiment of the present invention will now be described according to the drawings. FIG. 1 shows one embodiment of a hot water supply system according to the present invention.

The hot water supply system includes two water heaters D1, D2. The water heaters D1 and D2 are respectively water heaters having versatility of similar configuration as described below.

The water heater D1 includes a casing 10, and a gas burner 20 and a heat exchanger 30 are arranged in the casing 10. The gas burner 20 forms fuel-air mixture with outside air from an electrically operated fan FAN1 and fuel gas from a gas supply tube 21, and combusts the fuel-air mixture with the ignition of the igniter 22.

The electrically operated fan FAN 1 arranged at an appropriate location in the casing 10 introduces the outside air into the casing 10 from an air supply port 11 and supplies the air to the gas burner 20 according to the operation of the electrically operated fan FAN 1. The fuel gas is supplied from a gas supply source (not shown) to the gas supply tube 21 as shown with an arrow G in FIG. 1.

The heat exchanger 30 is arranged on a heat transfer tube 50 for connecting a water supply tube 40 and a hot water discharge tube 60 immediately above the gas burner 20, and the heat exchanger 30 heats the water in the heat transfer tube 50 with the heat exchange action based on the combustion heat of the fuel-air mixture by the gas burner 20.

The water supply tube 40 is connected to a basal end 141 of a water supply tube 140 (to be hereinafter described) of the water heater D2, and the water (see arrow W of FIG. 1) from the water supply source (not shown) such as water line flows into the water supply tube 40 through the basal end 141 of the water supply tube 140. The hot water discharge tube 60 discharges the water heated by the heat exchanger 30 from the distal end 61 through a hot water discharge plug (not shown).

In the water heater D1, source electromagnetic valve V1, electromagnetic proportional valve PSV1, and main electromagnetic valve MV1 are interposed in the gas supply tube 21 as shown in FIG. 1.

The source electromagnetic valve V1 and the main electromagnetic valve MV1 are both opened when supplying fuel gas to the gas burner 20 through the gas supply tube 21, and are both closed when supply of fuel gas is blocked. The electromagnetic proportional valve PSV1 supplies the fuel gas from the gas supply tube 21 to the gas burner 20 of a quantity corresponding to the opening degree. In FIG. 1, reference number 23 indicates a frame rod for detecting combustion flame of the gas burner 20.

In the water heater D1, a water throttle valve VW1 includes a stepping motor and a flow rate control valve, and is interposed in the water supply tube 40 described above as shown in FIG. 1. The water throttle valve VW1 flows the water from the water supply source to the heat transfer tube 50 through the water supply tube 40 according to the opening degree (corresponds to opening degree of water throttle valve VW1) of the flow rate control valve driven by the stepping motor.

Figure 2:
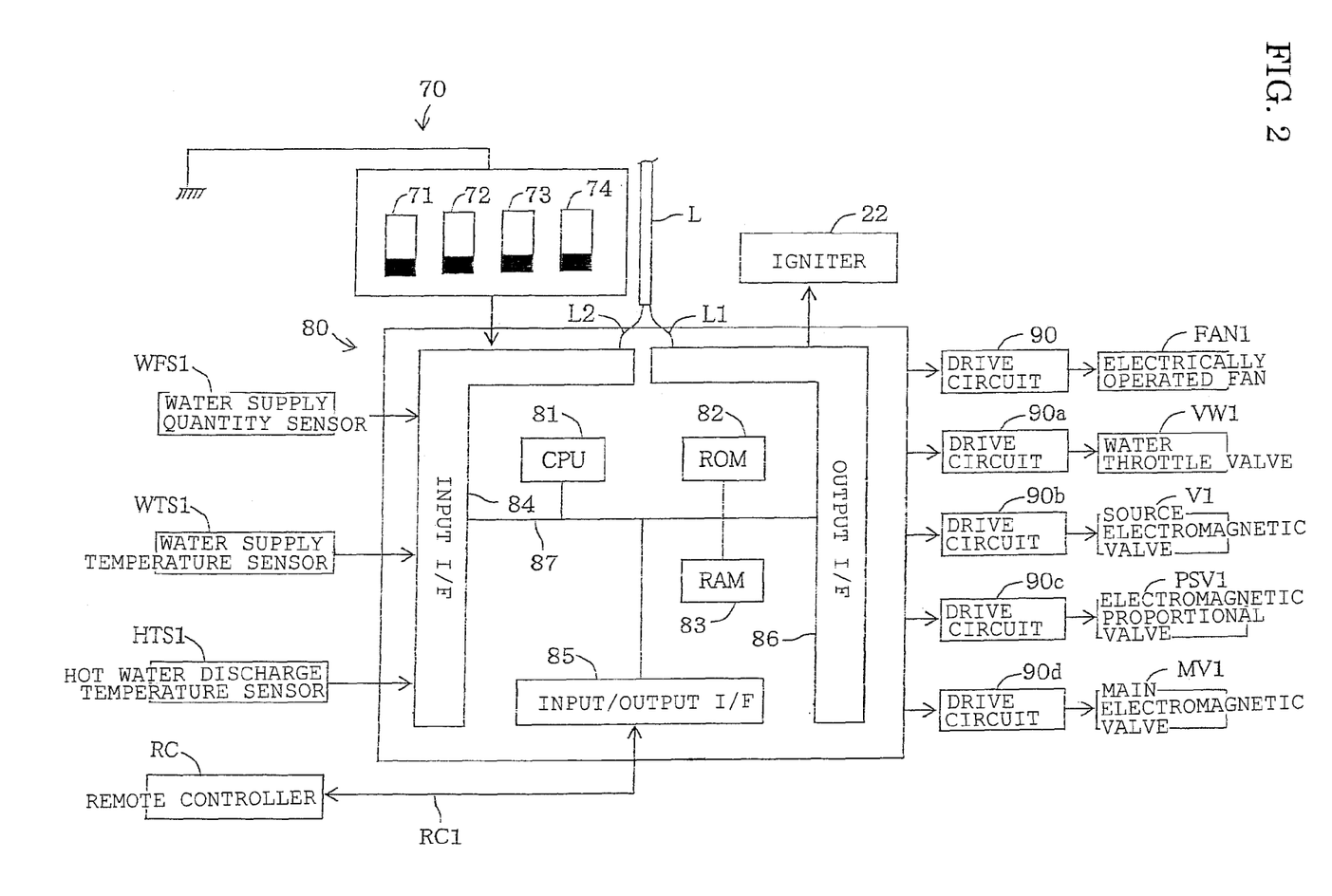
FIG. 2 is a block diagram showing an electrical control circuit of a water heater connected with a remote controller.

The configuration of an electrical control circuit of the water heater D1 will now be described. The electrical control circuit includes a remote controller RC for remote operation (hereinafter referred to as remote controller RC), water supply quantity sensor WFS1, water supply temperature sensor WTS1, and hot water discharge temperature sensor HTS1 as shown in FIG. 2.

The remote controller RC can be connected to either water heater D1, D2, but the remote controller RC is connected to the water heater D1 in the present embodiment. Specifically, the remote controller RC is connected to a microcomputer 80 incorporated in the water heater D1 with a connection cable RC1 (see FIG. 1 and FIG. 2).

The remote controller RC includes various operation switches such as hot water supply switch and temperature setting switch, and a display panel (not shown) on the operation screen (not shown). The hot water supply switch is ON operated when hot water supply is necessary, and OFF-operated when hot water supply is not necessary. The temperature setting switch is operated when setting the desired hot water discharge temperature, and generates set temperature data.

The water supply quantity sensor WFS1 is interposed in the water supply tube 40, as shown in FIG. 1, to detect the flow rate of the water in the water supply tube 40 as the water supply quantity. The water supply temperature sensor WTS1 is interposed in the water supply tube 40, as shown in FIG. 1, to detect the temperature of the water in the water supply tube 40 as water supply temperature. The hot water discharge temperature sensor HTS1 is interposed in a site of the tube near the outlet of the heat exchanger 30 of the hot water discharge tube 60, as shown in FIG. 1, to detect the temperature of the hot water flowing into the site of the tube near the outlet of the hot water discharge tube 60 from the heat exchanger 30 as the hot water discharge temperature.

The electrical control circuit includes a setting operator 70 (corresponds to setting operation means in the present invention) and the microcomputer 80, as shown in FIG. 2, where the setting operator 70 is operated when setting the connected hot water supply operation mode with the water heater D2 of the water heater D1 or the single hot water supply operation mode of the water heater D1 in constructing the hot water supply system.

Specifically, the setting operator 70 includes a dip switch having versatility that is adopted when setting various setting conditions for hot water supply by the water heater and the setting operator 70 as configured by four switches 71 to 74.

The switch 71 is operated in the ON state when setting the water heater D1 to the connected hot water supply operation mode with the water heater D2, and operated in the OFF state when setting to the single hot water supply operation mode of the water heater D1 in constructing the hot water supply system. This means that the setting operator 70 is also used as a switching means for performing the switch setting operation between the single hot water supply operation mode and the connected hot water supply operation mode, in addition to setting the various setting conditions for hot water supply by the water heater. In the present embodiment, the setting operator 70 is operated in the ON state by the switch 71.

Each of other switches 72 to 74 is operated in ON state or OFF state when setting various setting conditions other than the connected hot water supply operation mode and the single hot water supply operation mode. In the present embodiment, each switch is grounded to the fixed contacting point, and connected to the input interface 84 (to be hereinafter described) of the microcomputer 80 at the movable contacting point.

The microcomputer 80 includes CPU 81, ROM 82, RAM 83, input interface 84 (hereinafter referred to as input I/F 84), input/output interface 85 (hereinafter input/output I/F 85), and output interface 86 (hereinafter referred to as output I/F 86), and CPU 81, ROM 82, RAM 83, input I/F 84, input/output I/F 85 and output I/F 86 are connected to each other via a bus line 87.

Then, the microcomputer 80 executes the control program (hereinafter referred to as first operation mode control program) according to the flow charts shown in FIG. 4 to FIG. 7 under the output from the setting operator 70, output from remote controller RC, and each detection output from the water supply quantity sensor WFS1, the water supply temperature sensor WTS1 and the hot water discharge temperature sensor HTS1 by the CPU 81, and performs various calculation processes such as calculation process required in performing the drive control of the igniter 22, the display panel of the remote controller RC, and each drive circuit 90 to 90d via the RAM 83, the input I/F 84, the input/output I/F 85, and the output I/F 86.

In the present embodiment, the hot water supply system is already connected to a commercial power supply in construction. Therefore, the microcomputer 80 repeats the execution of the first operation mode control program while being maintained in the activating state under the power supply from the commercial power supply. The first operation mode control program is readably stored in advance by the CPU 81 in the ROM 82 of the microcomputer 80.

Each drive circuit 90 to 90d drives the electrically operated fan FAN1, water throttle valve VW1, source electromagnetic valve V1, electromagnetic proportional valve PSV1, and main electromagnetic valve MV1 under the control by the CPU 81 of the microcomputer 80. In the present embodiment, the setting operator 70, the microcomputer 80, and each drive circuit 90 to 90d are arranged on a circuit substrate (not shown) in the casing 10.

The configuration of the water heater D2 will be described below. The water heater D2 has a configuration similar to the water heater D1 except that remote controller such as remote controller RC is not arranged.

In the water heater D2, casing 110 and air supply port 111 correspond to the casing 10 and the air supply port 11 of the water heater D1, and gas burner 120, gas supply tube 121, igniter 122, and frame rod 123 correspond to the gas burner 20, the gas supply tube 21, the igniter 22, and the frame rod 23 of the water heater D1 (see FIG. 1).

Figure 3:
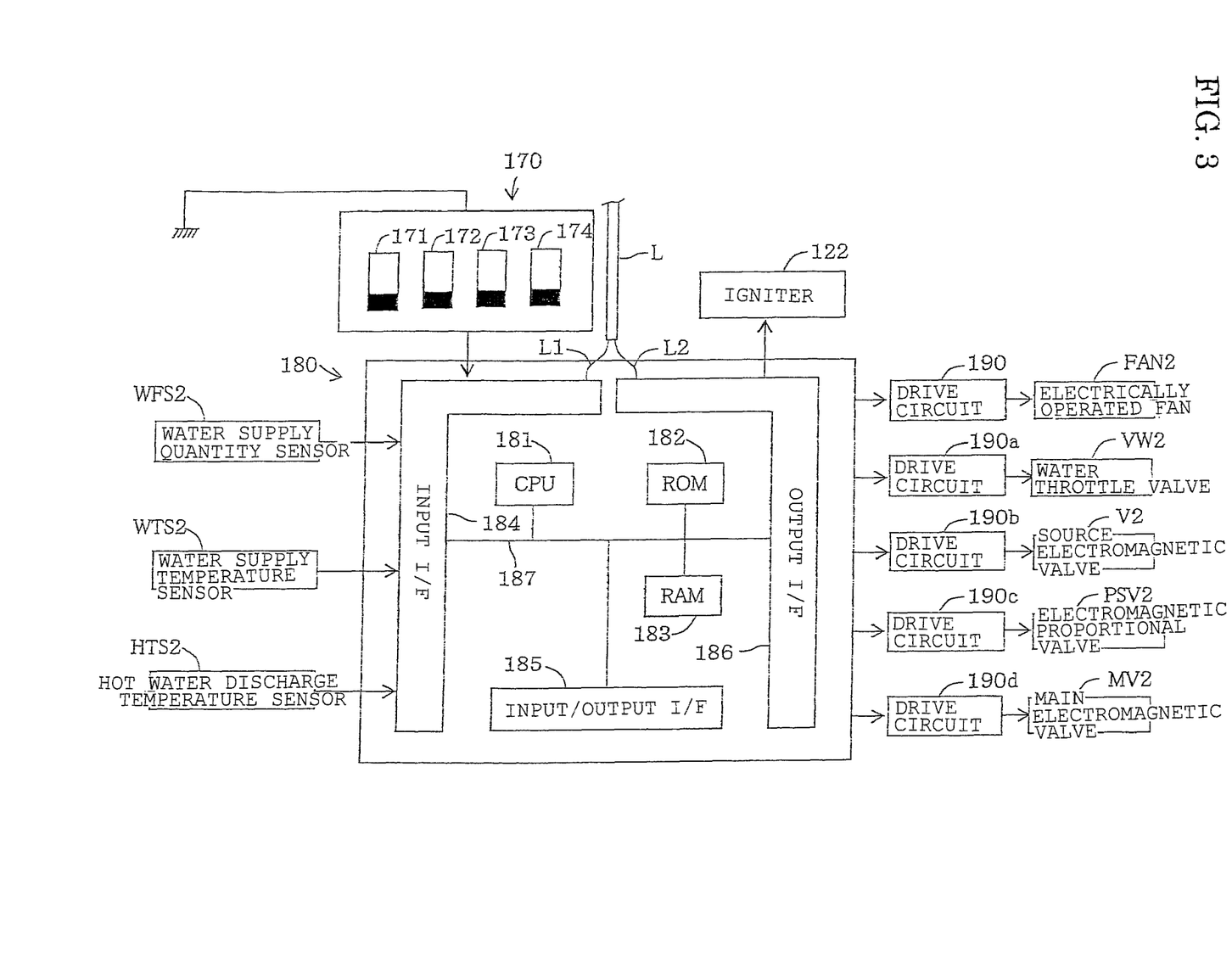
FIG. 3 is a block diagram showing an electrical control circuit of a water heater not connected with the remote controller.

In the water heater D2, heat exchanger 130, water supply tube 140, heat transfer tube 150, and hot water discharge tube 160 correspond to the heat exchanger 30, the water supply tube 40, the heat transfer tube 50, and the hot water discharge tube 60 of the water heater D1, and source electromagnetic valve V2, electromagnetic proportional valve PSV2, main electromagnetic valve MV2, and water throttle valve VW2 correspond to source electromagnetic valve V1, electromagnetic proportional valve PSV1, main electromagnetic valve MV1, and water throttle valve VW1 of the water heater D1 (see one of FIG. 1 to FIG. 3). However, in the relevant hot water supply system, the hot water discharge tube 160 is connected to the distal end 61 of the hot water discharge tube 60 of the water heater D1, and the hot water discharge tube 160 discharges the water in the heat transfer tube 150 heated by the heat exchanger 130 via the distal end 61 of the hot water discharge tube 60 and the hot water discharge plug.

In the water heater D2, the electrical control circuit shown in FIG. 3 corresponds to the electrical control circuit of the water heater D1. In the electrical control circuit of the water heater D2, water supply quantity sensor WFS2, water supply temperature sensor WTS2, hot water discharge temperature sensor HTS2, setting operator 170 (correspond to setting operation means in the present invention), microcomputer 180, and drive circuits 190 to 190d correspond to the water supply quantity sensor WFS1, the water supply temperature sensor WTS1, the hot water discharge temperature sensor HTS1, the setting operator 70, microcomputer 80, and the drive circuits 90 to 90d of the water heater D1 (see FIG. 3).

The setting operator 170 has a configuration similar to the setting operator 70, where each switch 171 to 174 corresponds to each switch 71 to 74 of the setting operator 70 in the setting operator 170. The setting operator 170 is operated in the ON state similar to the switch 71 of the setting operator 70 with the switch 171.

In the microcomputer 180, CPU 181, ROM 182, RAM 183, input I/F 184, input/output I/F 185, output I/F 186, and bus line 187 correspond to CPU 81, ROM 82, RAM 83, input I/F 84, input/output I/F 85, output I/F 86, and bus line 87.

The microcomputer 180 is connected to the output I/F 86 of the microcomputer 80 via a communication line L1 of a communication cable L at the input I/F 184, and connected to the input I/F 84 of the microcomputer 80 via a communication line L2 of the communication cable L at the output I/F 186. The communication cable L is formed with both communication lines L1, L2 covered. The input/output I/F 185 is an interface for connecting the remote controller RC.

The microcomputer 180 executes another control program (hereinafter referred to as second operation mode control program) according to the flow charts of FIG. 4 to FIG. 7 by the CPU 181 under the power supply from the commercial power supply, and the second operation mode control program is stored in advance in the ROM 182 of the microcomputer 180 as the program complying with the flow charts of FIG. 4 to FIG. 7.

Since first and second operation control programs are configured so as to comply with the same flow chart as described above in the present embodiment, the flow charts of FIG. 4 to FIG. 7 are described as each flow chart of the first and second operation mode control programs. The setting operator 170, the microcomputer 180, and each drive circuit 190 to 190d are arranged on the circuit substrate (not shown) in the casing 110.

In the present embodiment, water flowing system including water supply tube 40, heat transfer tube 50, hot water supply tube 60, and water throttle valve VW1, as well as heating system including gas burner 20, igniter 22, heat exchanger 30, electrically operated fan FAN 1, and electromagnetic proportional valve PSV1 in the water heater D1 correspond to the hot water supply means in the present invention. The water flowing system including water supply tube 140, heat transfer tube 150, hot water supply tube 160, and water throttle valve VW2, as well as heating system including gas burner 120, igniter 122, heat exchanger 130, electrically operated fan FAN 2, and electromagnetic proportional valve PSV2 in the water heater D2 correspond to the hot water supply means in the present invention.

In the present embodiment configured as above, the hot water supply system is in the operating state under the power supply from the commercial power supply with completion of its construction. As previously stated, in the water heater D1, the microcomputer 80 starts to execute the first operation mode control program already stored in the ROM 82 according to the flow charts of FIG. 4 to FIG. 7 by the CPU 81. On the other hand, in the water heater D2, the microcomputer 180 starts to execute the second operation mode control program already stored in the ROM 182 according to the flow charts of FIG. 4 to FIG. 7 by the CPU 181.

In the water heater D1, with the start of execution of the first operation mode control program as described above, the microcomputer 80 determines whether or not in the connected hot water supply operation mode setting or not in step 200 (see FIG. 4) by CPU 81. At the current stage, the setting operator 70 of the water heater D1 is operated to the ON state with the switch 71 as described above. This means that the water heater D1 is set to the connected hot water supply operation mode in advance in the hot water supply system.

Figure 4:
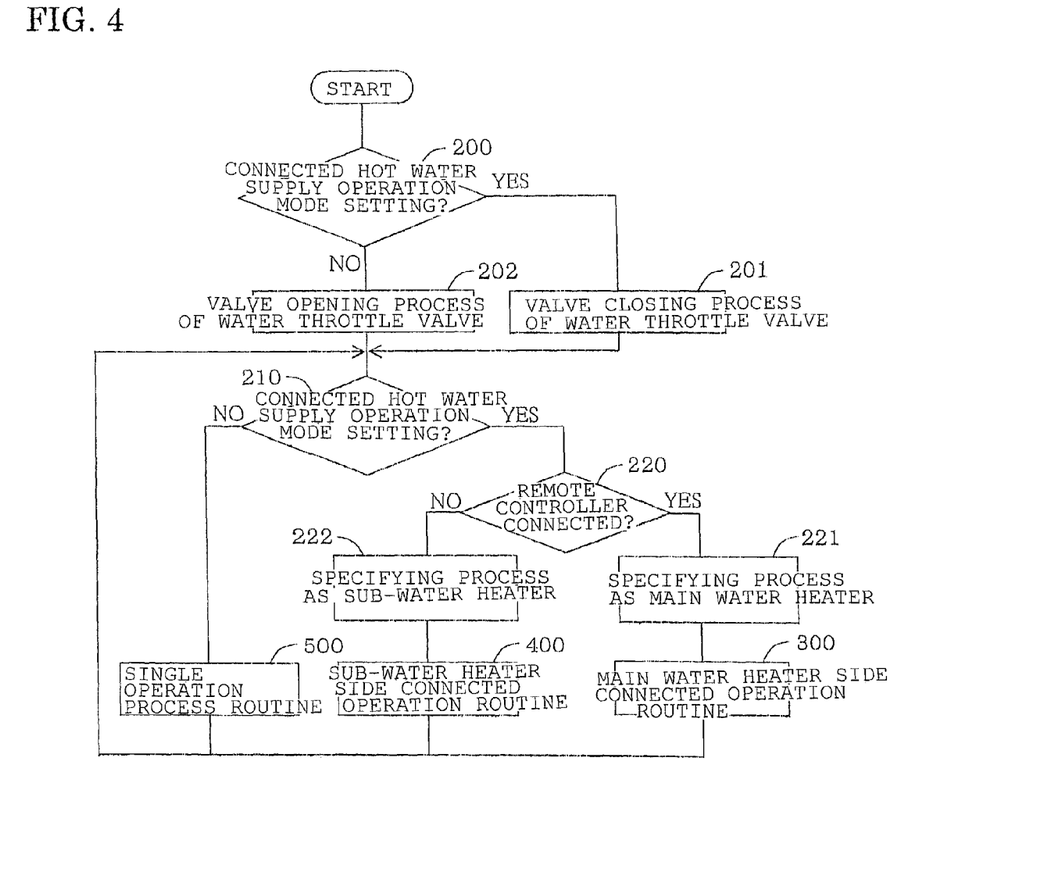
FIG. 4 is a flow chart showing operation of each microcomputer shown in FIG. 2 and FIG. 3.

Therefore, determination is made as YES in step 200, and valve closing process of the water throttle valve is performed in step 201. Here, the water throttle valve VW1 is closed by the drive circuit 90a in the water heater D1. The water supply from the water supply source to the water supply tube 40 is thus interrupted.

On the other hand, in the water heater D2, with the start of execution of the second operation mode control program as described above, the microcomputer 180 determines whether or not it is in the connected hot water supply operation mode setting in step 200 (see FIG. 4) by the CPU 181. As described above, the setting operator 170 is operated to the ON state with the switch 171 at the current stage. This means that the water heater D2 is set in the connected hot water supply operation mode in advance in the hot water supply system.

Therefore, similar to water heater D1 described above under the determination as YES in step 200, the water throttle valve VW2 of the water heater D2 is closed by the drive circuit 190a with the valve closing process of the water throttle valve in step 201. Thus, the water supply from the water supply source to the water supply tube 140 is interrupted.

Therefore, after the processes of both steps 200, 201 of the first and second operation mode control programs, the connected hot water supply operation mode process (correspond to connected operation control means in the present invention) including each step 220 to 222, main water heater side connected operation routine 330, and sub-water heater side connected operation process routine 400 are repeated as below via the process of step 210.

In the water heater D1, determination is made on whether or not it is in the connected hot water supply operation mode setting in step 210. At the current stage, the setting operator 70 is operated to the ON state with the switch 71, as described above. Therefore, determination is made as YES in step 210, similar to the connected process in step 200.

On the other hand, in the water heater D2, the setting operator 170 is operated to the ON state with the switch 71, and thus determination is made as YES in step 210.

Thus, the first and second operation mode control programs respectively proceed to the connected hot water supply operation mode process described above in both water heaters D1, D2 (see FIG. 4).

As described above, in the hot water supply system, each setting operator 70, 170 arranged in the water heaters D1, D2 are operated to the ON state in advance so as to set the water heaters D1, D2 in the connected hot water supply operation mode with each switch 71, 171. Under such an assumption, the determination as to the connected hot water supply operation mode setting is uniquely made in each water heater D1, D2, and the process proceeds to the connected hot water supply operation mode process.

Therefore, the water heaters D1, D2 may both be easily set to the connected hot water supply operation mode by simply using a simple component of setting operator 70, 170 including a dip switch having versatility without depending on a special circuit configuration as described in the means for solving the invention of the present specification.

Regarding each setting operator 70, 170, that used in setting various setting conditions of the water heater it is also used in the setting operation of the connected hot water supply operation mode of the two water heaters D1, D2. Therefore, the setting of the connected hot water supply operation mode is more conveniently performed by using the setting operators 70, 170.

As described above, after the first and second operation mode control programs proceed to the connected hot water supply operation mode process, determination on whether or not connection of the remote controller RC is found is made in step 220 (see FIG. 4) of the first operation mode control program in the water heater D1. Step 220 corresponds to the connection determination means in the present invention.

The remote controller RC is already connected to the input/output I/F 85 of the microcomputer 80 with the connection cable RC1 as described above. The connected state is recognized with the CPU 81 by the microcomputer 80, and determination is made as YES in step 220.

As a result, the water heater D1 is specified as the main water heater (hereinafter also referred to as main water heater D1) in step 221. After such a specification, the first operation mode control program proceeds to the main water heater side connected operation process routine 300 (see FIG. 4 to FIG. 6).

On the other hand, similarly, determination on whether or not connection of the remote controller RC is found is also made in step 220 (see FIG. 4) of the second operation mode control program in the water heater D2. At the current stage, the remote controller RC is not connected to the microcomputer 180, which is recognized with the CPU 181 by the microcomputer 180, and determination is made as NO in step 220.

As a result, the water heater D2 is specified as the sub-water heater (hereinafter also referred to as sub-water heater D2) in step 222. After such a specification, the second operation mode control program proceeds to the sub-water heater side connected operation process routine 400 (see FIG. 4 and FIG. 7). Each step 221, 222 corresponds to the specifying means in the present invention.

Figure 5:
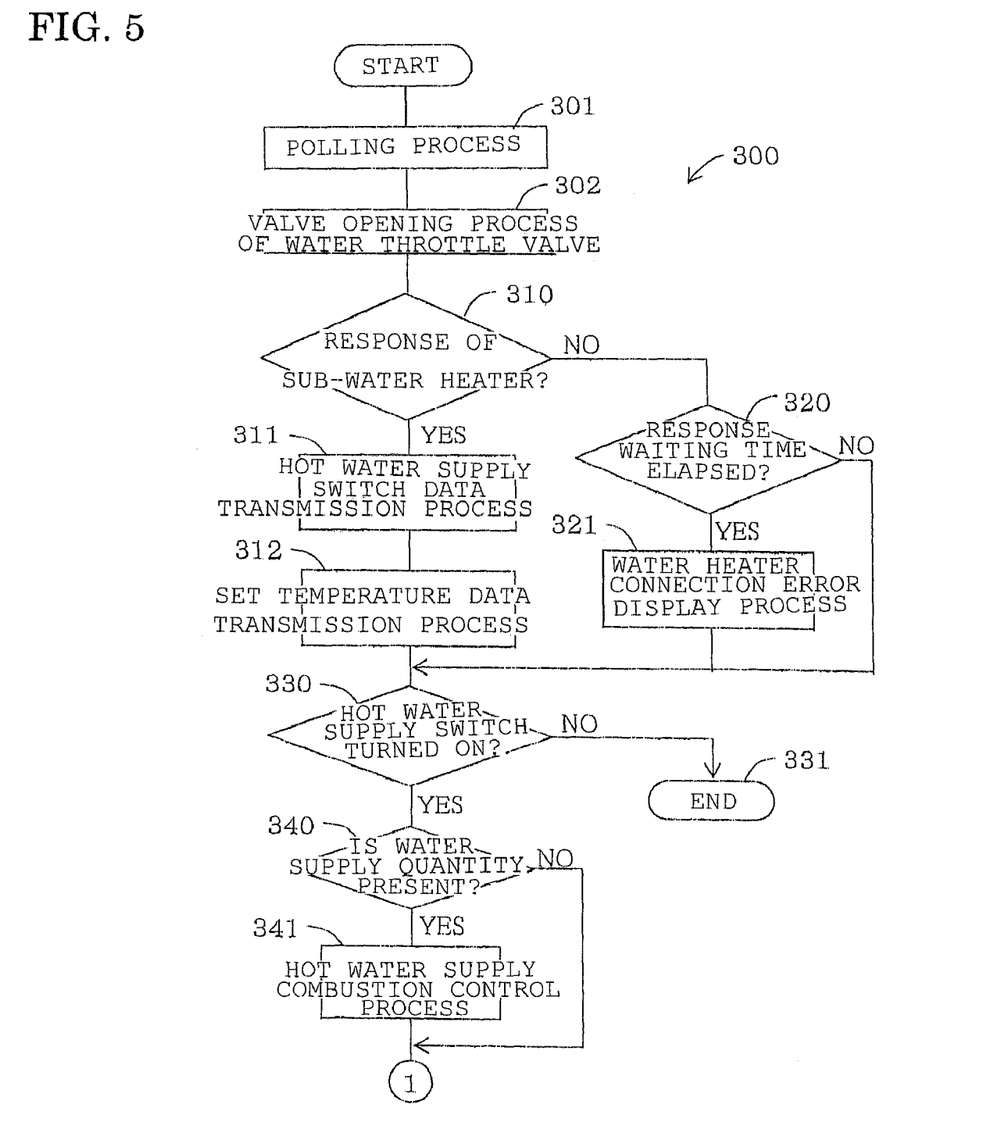
FIG. 5 is a pre-stage of detailed flow chart showing the main water heater side connected operation process routine of FIG. 4.
Figure 6:
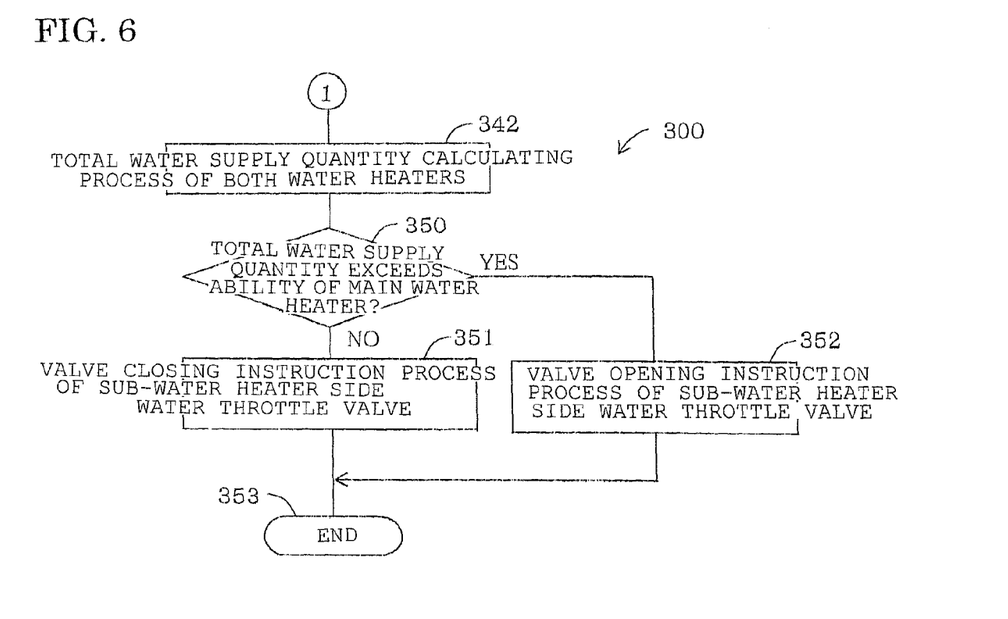
FIG. 6 is a post-stage of detailed flow chart showing the main water heater side connected operation process routine of FIG. 4.
Figure 7:
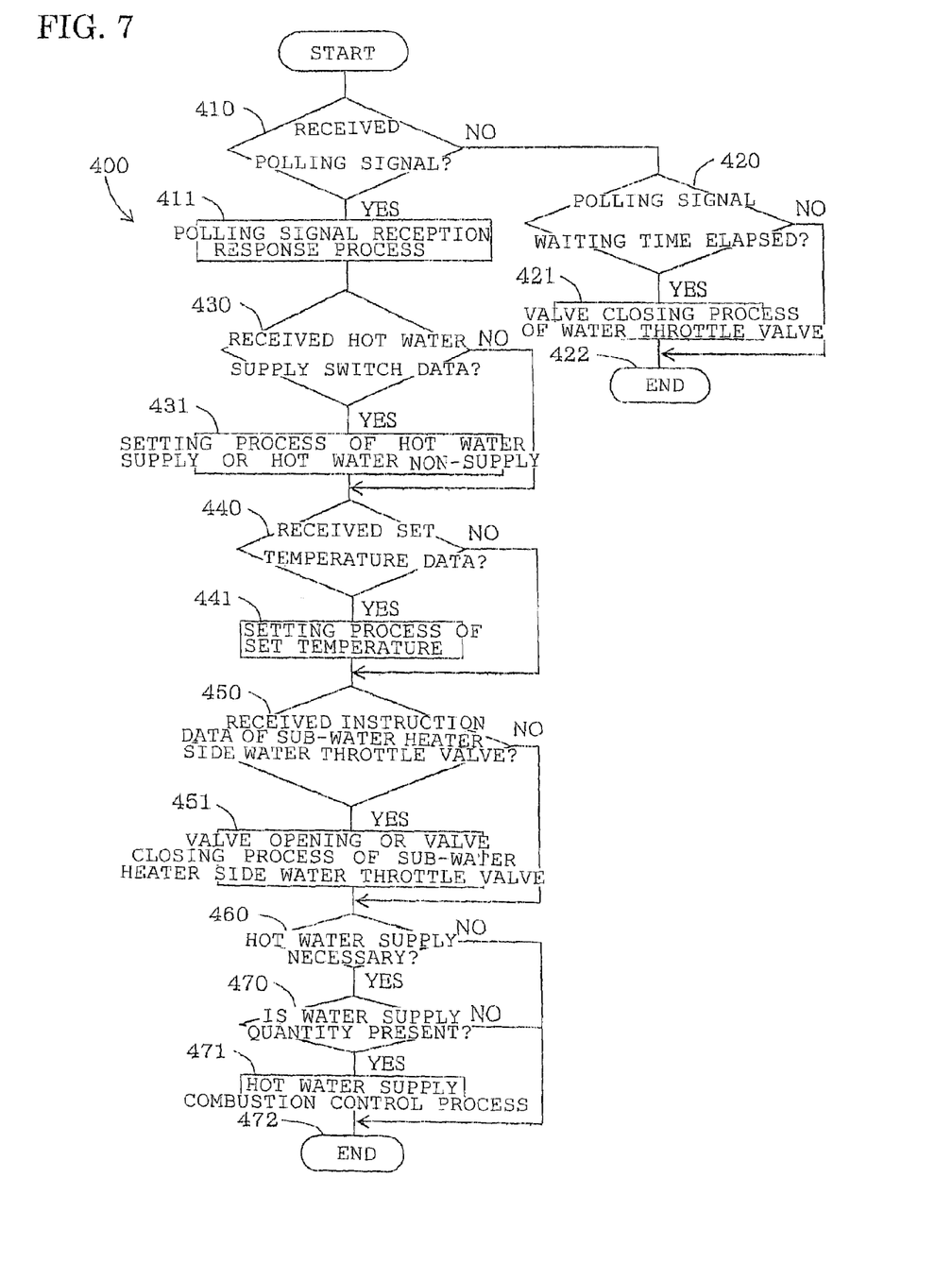
FIG. 7 is a detailed flow chart showing the sub-water heater side connected operation process routine.

The main water heater side connected operation process routine 300 in the main water heater D1 and the sub-water heater side connected operation process routine 400 in the sub-water heater D2 will be described below in view of the communication relationship with each other.

First, in the main water heater D1, polling process is performed in step 301 (see FIG. 5) of the main water heater side connected operation process routine 300. Here, the polling signal is generated in the CPU 81 by the microcomputer 80, and transmitted to the microcomputer 180 of the sub-water heater D2 via the output I/F 86 and the communication line L1.

After the process of step 301, valve opening process of the water throttle valve is performed in step 302. Accompanied therewith, the water throttle valve VW1 is opened by the drive circuit 90a. Therefore, the water from the water supply source is supplied to the water supply tube 40 via the basal end 141 of the water supply tube 140.

On the other hand, in the sub-water heater D2, determination on whether or not the polling signal is received from the microcomputer 80 is made in step 410 of the sub-water heater side connected operation process routing 400 (see FIG. 7).

Determination is made as YES in step 410 if the polling signal transmitted via the communication line L1 as described above is received via the input I/F 184 with the CPU 181 by the microcomputer 180 at the current stage. Then, in step 411, the reception response process of the polling signal is performed. Accompanied therewith, the response signal indicating the reception of the polling signal is generated with the CPU 181 by the microcomputer 180, and transmitted to the microcomputer 80 via the output I/F 186 and the communication line L2.

As described above, in the main water heater D1, after the process in step 302 (see FIG. 5) of the main water heater side connected operation process routine 300, determination in the presence or absence of the response of the sub-water heater D2 is made in step 310.

The determination is made as YES in step 310 if the response signal indicating the reception of the polling signal transmitted via the communication line L2 as described above is received via the input I/F 84 with the CPU 81 by the microcomputer 80. This means that reception of the polling signal by the sub-water heater D2 is confirmed in the main water heater D1.

Accompanied therewith, the hot water supply switch data transmission process is performed in the next step 311. If the hot water supply switch of the remote controller RC is ON operated or OFF operated, the ON operation or the OFF operation is the input supplied via the input/output I/F 85 to the CPU 81 of the microcomputer 80 via the connection cable RC1 from the remote controller RC as the hot water supply switch data. The hot water supply switch data is then transmitted to the microcomputer 180 by the CPU 18 via the output I/F 86 and the communication line L1.

The set temperature data transmission process is then performed in step 312. Here, if the set temperature is set by the operation of a temperature setting switch in the remote controller RC, the set temperature is transmitted to the microcomputer 180 similar to the hot water supply switch as the set temperature data.

On the other hand, in the sub-water heater D2, after the process of step 411 of the sub-water heater side connected operation process routine 400, determination is made on whether or not the hot water supply switch data is received in step 430.

The determination is made as YES in step 430 if the hot water supply switch data transmitted via the communication line L1 (as described above) is received through the input I/F 184 at the CPU 181 by the microcomputer 180.

Accompanied therewith, the setting process to hot water supply or hot water non-supply is made in step 431. That is, if the hot water supply switch data indicates ON operation of the hot water supply switch, the sub-water heater D2 setting is processed to the hot water supplying state. On the other hand, if the hot water supply switch data indicates OFF operation of the hot water supply switch, the sub-water heater D2 setting is processed to the hot water non-supplying state.

After the process of step 431 or after determined as NO in step 430, the presence or absence of reception of the set temperature data is determined in step 440. At this stage, the determination is made as YES in step 440 if the set temperature data transmitted through the communication line L1 is received via the input I/F 184 at the CPU 181 by the microcomputer 180. The setting process of the set temperature is made in step 441. Accompanied therewith, the set temperature of the sub-water heater D2 is set based on the set temperature data.

In the main water heater D1 as described above, determination is made on whether or not the hot water supply switch is turned ON in step 330 after the process at step 312 of the main water heater side connected operation process routine 300 is terminated.

Determination is made as a YES in step 330 if the hot water supply switch data indicates the ON operation of the hot water supply switch. The presence or absence of the water supply quantity is determined in step 340. At the current stage, determination is made as YES in step 340 if the water supply quantity in the water supply tube 40 detected by the water supply quantity sensor WFS1 of the main water heater D1 is not zero, and the hot water supply combustion control process is performed in step 341.

With the hot water supply combustion control process, the fuel gas supplied from the gas supply source via the source electromagnetic valve V1, the electromagnetic proportional valve PSV1, and the main electromagnetic valve MV1 is mixed with outside air supplied by the electrically operated fan FAN 1 in the gas burner 20 to generate fuel-air mixture under each detection output of the water supply quantity sensor WFS1, water supply temperature sensor WTS1, and the hot water discharge temperature sensor HTS1 in the main water heater D1, and the fuel-air mixture is then combusted by the gas burner 20 under ignition of the igniter 22. Thus, the water in the heat transfer tube 50 is generated as hot water with the heat exchange action of the heat exchanger 30. The hot water generated in such manner is supplied by opening the hot water discharge plug.

After the process of step 341 or after it is determined as NO in step 340 as described above, the total water supply quantity calculating process of both water heaters is performed in step 342 (see FIG. 6). When the microcomputer 80 transmits a request command of the water supply quantity data to the microcomputer 180 via the communication line L1 by the CPU 81, the microcomputer 180 transmits the detected water supply quantity of the water supply quantity sensor WFS2 to the microcomputer 80 via the communication line L2 as data by the CPU 181. Thus, the sum of the detected water supply quantity of the water supply quantity sensor WFS1 and the detected water supply quantity of the water supply quantity sensor WFS2 is calculated as the total water supply quantity in step 342.

Thereafter, determination is made on whether or not ability of the main water heater is exceeded in step 350. At this stage, determination in step 350 is made as NO if the used quantity of hot water has not reached the hot water suppliable quantity of the main water heater D1 and the total water supply quantity in step 342 has not exceeded the ability of the main water heater D1, and the valve closing instruction process of the sub-water heater side water throttle valve is performed in step 351. Accompanied therewith, the valve closing instruction data of the water throttle valve VW2 is transmitted to the microcomputer 180 through the communication line L1 with the CPU 81 by the microcomputer 80.

Determination in step 350 is made as a YES if the total water supply quantity in step 342 exceeds the ability of the main water heater D1 since the used quantity of the hot water exceeds the hot water suppliable quantity of the main water heater D1.

After it is determined as YES in step 350, the valve opening instruction process of the sub-water heater side water throttle valve is performed in step 352. The valve opening instruction data of the water throttle valve VW2 is then transmitted to the microcomputer 180 via the communication line L1 with the CPU 81 by the microcomputer 80. After the process of step 351 or 352 is terminated, the first operation control mode program returns to step 210 (see FIG. 4) via end step 353.

On the other hand, in the sub-water heater D2, after the process described above in step 441 of the sub-water heater side connected operation process routine 400, or after determined as NO in step 440, determination on whether or not the instruction data for the sub-water heater side water throttle valve is received.

If the valve closing instruction data of the sub-water heater side water throttle valve in step 351 or the valve opening instruction data of the sub-water heater side water throttle valve in step 352 is received at the current stage, determination is made as YES in step 450.

Accompanied therewith, the process of valve opening and valve closing of the sub-water heater side water throttle valve is performed in step 451. Then, if the valve closing instruction data of the sub-water heater side water throttle valve is received in step 351, the water throttle valve VW2 is opened by the drive circuit 190a. This means that hot water supply is performed only with the main water heater D1 without the hot water supplied by the sub-water heater D2 since the ability of the main water heater D1 is not exceeded, as described above.

On the other hand, if the valve opening instruction data of the sub-water heater side water throttle valve is received in step 352, the water throttle valve VW2 is opened by the drive circuit 190a. Therefore, water from the water supply source is supplied to the water supply tube 140. This means that the hot water supplied by the sub-water heater D2 is performed with the hot water supplied by the main water supply D1 since the ability of the main water heater D1 is exceeded as described above.

After the process of step 451, determination is made on whether or not hot water supply is required in step 460. If the setting process is performed to the hot water supplying state in step 431, determination is made as a YES in step 460 since the hot water supply is necessary.

Determination is made on the presence or absence of water supply quantity in step 470. Determination is made as a YES in step 470 if the water supply quantity in the water supply tube 140 detected by the water supply quantity sensor WFS2 is not zero at the current stage.

The hot water supply combustion control process is performed in step 471. The fuel gas supplied from the gas supply source via the source electromagnetic valve V2, the electromagnetic proportional valve PSV2, and the main electromagnetic valve MV2 is mixed with outside air supplied by the electrically operated fan FAN 2 in the gas burner 120 to form fuel-air mixture under each detection output of the water supply quantity sensor WFS2, water supply temperature sensor WTS2, and the hot water exist temperature sensor HTS2 in the sub-water heater D2, and the fuel-air mixture is combusted by the gas burner 120 under the ignition of the igniter 122 in step 471. Thus, the water in the heat transfer tube 150 is generated as hot water with the heat exchange action of the heat exchanger 130, and hot water is supplied by opening the hot water discharge plug.

After the process of step 471 or after it is determined as NO in one of steps 460 or 470, the second operation mode control program returns to step 210 (see FIG. 4) via the end step 472.

In the operations described above, when the main water heater side connected operation process routine 300 proceeds to step 310 in the main water heater D1 as described above, determination is made as a NO if the response signal indicating the reception of the polling signal is not received by the CPU 81 of the microcomputer 80.

After such determination, the determination is made as YES in step 320 if a response waiting time with respect to the response signal indicating the reception of the polling signal has elapsed. The water heater connection error display process is then performed in step 321.

The connecting operation error display data is created and output from the microcomputer 80 to the remote controller RC via the connection cable RC1. Accompanied therewith, the remote controller RC displays the display data on the display panel. The operator then visibly recognizes that the connecting operation of the water heaters D1, D2 in the hot water supply system has failed.

In the main water heater D1, if made or after the process of step 321 is determined as NO in step 320, the determination is made on whether or not the hot water supply switch is turned ON in step 330. Determination is made as NO if the hot water supply switch data indicates OFF operation of the hot water supply switch, and the first operation mode control program returns to step 210 (see FIG. 4) via the end step 331.

On the other hand, in the sub-water heater D2, after the sub-water heater side connected operation process routine 400 reaches step 410 as described above, the determination is made as a NO in step 410 if the polling signal is not yet received by the CPU 181 of the microcomputer 180, and the determination is made on whether or not polling signal waiting time has elapsed.

If determined as a YES in step 420, the valve closing process of the water throttle valve is performed in step 421. Accompanied therewith, the water throttle valve VW2 is then closed by the drive circuit 190a in the sub-water heater D2. Thus, supply of water from the water supply source to the water supply tube 140 is interrupted. After the process of step 421 or after it is determined as a NO in step 420, the second operation mode control program returns to step 210 (see FIG. 4) via the end step 422.

As described above, in the connected hot water supply operation mode of both water heaters D1, D2, the water heater D1 is specified as the main water heater and the water heater D2 is specified as the sub-water heater based on the recognition of the connection between the microcomputer 80 and the remote controller RC. Therefore, the water heater responsible for the main action and the water heater dependent thereon are reliably specified in the connected hot water supply operation mode based on the recognition of the connection with the remote controller RC with the determination of the setting of the connected hot water supply operation mode.

As a result, under such specification, the hot water supply in the connected hot water supply operation mode is appropriately realized with the water heater D1 serving as the main water heater and the water heater D2 serving as the sub-water heater under mutual communication via both communication lines L1, L2.

In the hot water supply system, each setting operator 70, 170 having versatility is arranged in the respective water heaters D1, D2 and the first and second connected hot water supply operation mode control programs both specified in the flow charts of FIG. 4 to FIG. 7 are used in each water heater D1, D2 in determining the presence or absence of the setting of the connected hot water supply operation mode, as described above. The communication lines L1, L2 serve as mutual communication lines between both water heaters D1, D2.

In other words, both water heaters D1, D2 may be provided as water heaters having versatility of similar configuration with a simple circuit configuration of the setting operator and the communication lines as described above without requiring dedicated water heater and circuit configuration as described in the problems to be solved in the present specification.

Therefore, for example, when building the hot water supply system by using only the water heater D1 in the initial construction, and thereafter, using the water heater D2 to increase the water heater to two water heaters, it is economical in that replacement of water heater and electric control circuit thereof is not required since the water heaters D1, D2 are water heaters having the versatility of a similar configuration.

As a result, the building of the hot water system is very easy and economical, and furthermore, management cost of the hot water supply system is greatly reduced by using the water heaters D1, D2 as described above.

A case where the hot water supply system is in a single hot water supply operation mode will now be described. Each switch 71, 171 of each setting operator 70, 170 differs from the above in each water heater D1, D2, and when operated to the OFF state, determination is made as NO in step 200 (see FIG. 4) of the first and second operation mode control programs, and the valve opening process of the water throttle valve is performed in step 202. Accompanied therewith, each water throttle valve VW1, VW2 is then opened by the respective drive circuit 90a, 190a. Thus, the water of the water supply source is supplied to each water supply tube 40, 140.

As described above, after the process of both steps 200, 202, the process through step 210 and the single operation process routine 500 of the first and second operation mode control programs are repeated as below. The single operation process routine 500 corresponds to single operation control means in the present invention.

In other words, in both water heaters D1, D2, the determination is made as a YES in each step 210 in the first and second operation mode control programs since each switch 71, 171 of each setting operator 70, 170 is operated to the OFF state as described above, and hot water supply control for each single hot water supply operation mode of both water heaters D1, D2 is performed in a single operation process routine 500.

The present invention is not limited to the above embodiments, and various modifications as described below are also possible.

(1) In the above embodiment, each hot water supply by the water heaters may be alternately performed according to a predetermined rotation condition in supplying hot water by both water heaters. The rotation may be imposed on the hot water supply of both water heaters under the predetermined rotation condition by storing hot water supplying time of the water heater in the main hot water supplying state of both water heaters in the non-volatile memory as data, and referencing the stored data of the non-volatile memory.

(2) In the above embodiment, the remote controller RC may be connected to the microcomputer 180 of the water heater D2 instead of the microcomputer 80 of the water heater D1. Accordingly, the water heater D2 is specified as the main water heater and the water heater D1 is specified as the sub-water heater.

(3) The setting operator 70 or 170 may be connected to the positive side terminal of the DC power supply as opposed to the above embodiment at the fixed contacting point of each switch.

(4) The switch 71 of the setting operator 70 or the switch 171 of the setting operator 170 may be operated to the OFF state when setting the connected hot water supply operation mode of both water heaters D1, D2 as opposed to the above embodiment, and may be operated to the ON state when setting the single hot water supply operation mode of one of the water heaters D1, D2.

(5) The setting operator 70 or 170 is not limited to the dip switch, and merely needs to be a switch having versatility of configuration and function similar to the dip switch.

(6) The present invention is not limited to two water heaters D1, D2 described in the above embodiment, and may be applied to the hot water supply system including at least two water heaters.

In this case, each microcomputer of the at least two water heaters is connected to each other via a communication cable L, similar to the above embodiment.

(7) The present invention may be applied to the hot water supply system of various other facilities such as general household, Laundromat, hospitals, and the like.

What is claimed is:

1. A hot water supply system comprising: at least two water heaters each including a hot water supplying means for heating water supplied to a water passing system in response to combustion of fuel gas and supplying hot water; a setting operation means for performing various setting operations related to the hot water supply by the hot water supplying means; and an operation controlling means for operation controlling the hot water supplying means based on the setting operation of the setting operation means, wherein the operation controlling means of one hot water supplying means is serially connected to the operating controlling means of another hot water supplying means via a communication means and performing operation control under mutual communication via the communication means; wherein the communication means is a communication line for connecting the operation controlling means to each other;

every operation controlling means of the at least two water heaters includes a single operation controlling means for operation controlling to have a corresponding water heater in a single hot water supply operation mode and a connected operation controlling means for connected operation controlling under mutual communication via a communication line so as to have the corresponding water heater in a connected hot water supply operation mode with the other water heater; and every setting operation means of the at least two water heaters also serves as a switching means for switching between the single hot water supply operation mode of the corresponding water heater and the connected hot water supply operation mode with the other water heater.

2. The hot water supply system according to claim 1, further comprising a remote controller for remote operation; wherein the connected operation controlling means of the at least two water heaters includes a connection determining means for determining the presence or absence of connection with the remote controller, and a specifying means for specifying the water heater having the connected operation controlling means as a main water heater when determined as connected with the remote controller by the connection determining means, and specifying the water heater having the connected operation controlling means as a sub-water heater when determined as not connected with the remote controller by the connection determining means; and the connected operation controlling means of the water heater specified as the main water heater of at least two water heaters mainly performs the connected operation control on the connected operation controlling means of the other water heater under mutual communication via a serially connected communication line, and the connected operation controlling means of the water heater specified as the sub-water heater dependently performs the connected operation control on the connected operation controlling means of the other water heater under mutual communication via the communication line.

3. The hot water supply system according to claim 1, wherein each setting operation means of the at least two water heaters is a dip switch.

4. The hot water supply system according to claim 2, wherein each setting operation means of the at least two water heaters is a dip switch.

* * * * *